(12) United States Patent
Lee

(10) Patent No.: US 8,385,296 B2
(45) Date of Patent: Feb. 26, 2013

(54) MULTI-CARRIER CDMA TRANSMITTING DEVICE AND METHOD USING BLOCK-BASED MULTI-CARRIER SPREADING

(75) Inventor: Kye-San Lee, Seoul (KR)

(73) Assignee: Industry Academic Cooperation Foundation of Kyunghee University, Yongin-Si (KR)

( * ) Notice: Subject to any disclaimer, the term of this patent is extended or adjusted under 35 U.S.C. 154(b) by 1416 days.

(21) Appl. No.: 11/572,448

(22) PCT Filed: Jul. 22, 2005

(86) PCT No.: PCT/KR2005/002383
§ 371 (c)(1),
(2), (4) Date: Jan. 22, 2007

(87) PCT Pub. No.: WO2006/009411
PCT Pub. Date: Jan. 26, 2006

(65) Prior Publication Data
US 2008/0298335 A1 Dec. 4, 2008

(30) Foreign Application Priority Data

Jul. 22, 2004 (KR) ........................ 10-2004-0057174

(51) Int. Cl.
*H04B 7/216* (2006.01)
(52) U.S. Cl. ........ 370/335; 370/203; 370/204; 370/208; 370/209; 370/328; 370/329; 370/341; 370/342; 375/130; 375/140; 375/145; 375/146; 375/147
(58) Field of Classification Search .................. 375/130, 375/140–149, 260, 267, 295, 299, 347, 349; 370/208–210, 329–331, 335, 342, 343, 345, 370/436, 441, 465, 478, 479, 481, 203, 204, 370/328, 341; 455/39, 45, 73, 91, 101–103, 455/130, 132, 137, 230, 269, 271, 272, 450, 455/452.1, 517, 524, 525, 561, 562.1
See application file for complete search history.

(56) References Cited

U.S. PATENT DOCUMENTS 5,463,660 A * 10/1995 Fukasawa et al. ............ 370/342
5,533,012 A * 7/1996 Fukasawa et al. ............ 370/342
(Continued)

FOREIGN PATENT DOCUMENTS
EP 955736 10/1999
KR 2001-46158 6/2001
(Continued)

*Primary Examiner* — Olumide T Ajibade Akonai
(74) *Attorney, Agent, or Firm* — Lexyoume IP Meister, PLLC.

(57) ABSTRACT

A multi-carrier CDMA transfer device using block-based partial-carrier spreading uses block-based partial-carrier spreading in the multi-cell environment to be applied to MC-CDMA models (FH-MC/CDMA TDD) that are strong against multi-path fading. A transmitter of the transfer device spreads carriers per block in the frequency domain by using the block-based partial-carrier spreading, and a receiver despreads received signals by using the block-based partial-carrier and restore original data. Optionally, an array antenna having a plurality of antenna elements is applied to the transmitter and the receiver, and weights are adaptively applied depending on the channel quality when transmitting and receiving signals through the antenna elements. Therefore, frequency diversity is obtainable and inter-cell interference and inter-code interference is optimized in the MC-CDMA method. Also, changes of frequency hopping reduce temporal variations of channels and prevent a high SN ratio.

31 Claims, 14 Drawing Sheets

U.S. PATENT DOCUMENTS

| | | | |
|---|---|---|---|
| 6,097,712 | A | 8/2000 | Secord |
| 6,359,874 | B1* | 3/2002 | Dent ................................ 370/342 |
| 6,728,298 | B1* | 4/2004 | Okubo et al. ................. 375/146 |
| 6,728,538 | B2* | 4/2004 | Jou et al. ........................ 455/434 |
| 6,868,077 | B1* | 3/2005 | Gourgue et al. .............. 370/342 |
| 6,870,826 | B1* | 3/2005 | Ishizu ............................ 370/343 |
| 6,927,728 | B2* | 8/2005 | Vook et al. .................... 342/377 |
| 6,959,052 | B2* | 10/2005 | Harada et al. ................. 375/340 |
| 6,999,467 | B2* | 2/2006 | Krauss et al. ................. 370/441 |
| 7,092,431 | B2* | 8/2006 | Maeda et al. ................. 375/144 |
| 7,095,778 | B2* | 8/2006 | Okubo et al. ................. 375/130 |
| 7,099,697 | B2* | 8/2006 | Okawa et al. ............. 455/562.1 |
| 7,106,249 | B2* | 9/2006 | Kubo et al. ................... 342/174 |
| 7,123,580 | B2* | 10/2006 | Tang et al. .................... 370/210 |
| 7,164,696 | B2* | 1/2007 | Sano et al. .................... 370/478 |
| 7,298,722 | B2* | 11/2007 | Sudo ............................. 370/335 |
| 7,315,563 | B2* | 1/2008 | Smith et al. .................... 375/130 |
| 7,366,222 | B2* | 4/2008 | Song et al. ..................... 375/130 |
| 7,386,031 | B2* | 6/2008 | Seki et al. ...................... 375/146 |
| 7,406,067 | B2* | 7/2008 | Deng et al. ..................... 370/335 |
| 7,450,536 | B2* | 11/2008 | Li et al. .......................... 370/321 |
| 7,457,324 | B2* | 11/2008 | Abeta et al. .................... 370/521 |
| 7,496,128 | B2* | 2/2009 | Giannakis et al. ............. 375/138 |
| 7,532,660 | B2* | 5/2009 | Chae et al. ..................... 375/144 |
| 7,593,449 | B2* | 9/2009 | Shattil ............................ 375/130 |
| 7,672,384 | B2* | 3/2010 | Giannakis et al. ............. 375/260 |
| 2002/0181421 | A1 | 12/2002 | Sano et al. |
| 2004/0233871 | A1* | 11/2004 | Seki et al. ...................... 370/331 |
| 2006/0251149 | A1* | 11/2006 | Fujii ............................... 375/146 |

FOREIGN PATENT DOCUMENTS

WO            02-09334        1/2002

\* cited by examiner

<OFDM-TDMA>

<OFDM-FDMA>

MULTI-CARRIER CDMA TRANSMITTING DEVICE AND METHOD USING BLOCK-BASED MULTI-CARRIER SPREADING

TECHNICAL FIELD

The present invention relates to a radio communication method for high data rates. More specifically, the present invention relates to a multi-carrier CDMA transfer device and method to minimize inter-cell and inter-code interference reduction and obtain frequency diversity in a radio communication environment applying user multiplexing using a block-based multi-carrier spreading.

BACKGROUND ART

The current radio communication system uses the IMT 2000 standard which realizes data rates of 144 kbps in the mobile environment and 2 Mbps in the stationary environment.

However, a higher-rate radio system is required so as to realize multimedia communication such as e-mail, high-rate Internet access, transmission of high-precision moving pictures, and downloads of huge volumes of files in the mobile environment. Recently, $3.5^{th}$ and $4^{th}$ generation radio communication studies have been progressing, which aim at the data rates of 5 Mbps at a maximum in the mobile condition and several tens of Mbps in the stationary condition.

In order to realize high-rate and high-quality information transmission in the radio communication environment, transmission methods with strong characteristics against deterioration of communication quality and high frequency allowance are needed, which include Orthogonal Frequency Division Multiplex (OFDM) and the Multi-Carrier-Code Division Multiple Access (MC-CDMA) systems.

The OFDM scheme for applying a plurality of orthogonal carriers to the CDMA scheme to thus realize multiplexing is classified as the OFDM Time Division Multiple Access (OFDM-TDMA) for allowing a plurality of users to use different time slots as shown in FIG. 1, and the OFDM Frequency Division Multiple Access (OFDM-FDMA) for allowing different users to use predetermined carriers as shown in FIG. 2.

The MC-CDMA, categorized as the CDMA schemes, loads user information on different carriers and provides the same to the frequency domain so that a plurality of users may perform communication through code multiplexing as shown in FIG. 3.

However, the above-described OFDM scheme is weak in interference generated by other cells in the multi-cell environment, and hence, the bit error rate (BER) and communication capacity are problematically worsened because of the interference, and the above-noted MC-CDMA scheme is strong against interference provided by other cells but inter-code interference is increased to worsen system performance when the number of users in a cell is increased, and the same is weak in the peak to average power ratio (PAPR).

DISCLOSURE

Technical Problem

It is an advantage of the present invention to provide an MC-CDMA transfer device and method for applying a block-based multi-carrier spreading to the MC-CDMA to obtain frequency diversity and optimizing inter-cell interference and inter-code interference to improve data rates and communication performance by using user multiplexing based on a block-based multi-carrier spreading.

Technical Solution

In one aspect of the present invention, a transmitting device for the multi-carrier CDMA scheme comprises: a serial to parallel converter for converting input data into parallel data; a plurality of copiers for copying each of the parallel data as many times as the number of spread factors; a spreader for spreading the respective data output by the plurality of copiers with respect to the frequency axis using different spread codes, the spreader spreading a part of blocks composed of multi-carriers for multiplexing users; and an IFFT unit for performing inverse fast Fourier transform (IFFT) on the data spread by the spreader and transmitting the IFFT-performed data through a transmit antenna.

In another aspect of the present invention, a receiving device for the multi-carrier CDMA comprises: an FFT unit for performing fast Fourier transform (FFT) on signals received through a receive antenna, and outputting data; a despreader for despreading the data output by the FFT with different spread codes, the different spread codes being codes used when spreading a part of blocks composed of multi-carriers for multiplexing users; a plurality of combiners for dividing the data despread by the despreader into a predetermined number of blocks, combining data of the respective blocks, and outputting the combined data; and a parallel to serial converter for converting the data output by the plurality of combiners into serial data, and outputting the serial data.

In still another aspect of the present invention, a transmitting device for the multi-carrier CDMA comprises: an array antenna having a plurality of antenna elements; a spreader for copying the data output by the array antenna as many times as a predetermined number of blocks, and spreading the data with different spread codes according to the copied data blocks, the spreader spreading a part of the copied data blocks composed of multi-carriers for multiplexing users; N adaptive transmission controllers for applying weights to the respective data spread by the spreader, performing IFFT on the weighted data, and outputting the executed data to a corresponding antenna element of the antenna elements wherein N corresponds to the number of the antenna elements of the array antenna; and a weight controller for controlling the weights of the adaptive transmission controllers according to a channel quality.

In still yet another aspect of the present invention, a receiving device for the multi-carrier CDMA comprises: an array antenna having a plurality of antenna elements; N adaptive receiving controllers for performing FFT on the signals output by the array antenna, applying corresponding weights to the executed signals, and outputting weighted signals wherein N corresponds to the number of the antenna elements of the array antenna; a weight controller for controlling the weight of the adaptive receiving controllers according to a channel quality; a despreader for despreading the data output by the adaptive receiving controller with different spread codes, the different spread codes being codes used when spreading a part of blocks composed of multi-carriers for multiplexing users; and a plurality of combiners for dividing the data despread by the despreader into a predetermined number of blocks, combining the data of the respective divided blocks, and outputting data.

The spreader spreads the data input for spreading by using carriers with less correlation in the frequency domain.

The despreader despreads the FFT-performed data by using carriers with less correlation in the frequency domain.

In still further another aspect of the present invention, a transfer device comprises: an array antenna having a plurality of antenna elements; a transmitter for applying a weight to the respective transmission data and transmitting the weighted transmission data through the array antenna according to the multi-carrier CDMA method based on block-based partial-carrier spreading, the weight allowing adaptive control; and a receiver for receiving the data through the array antenna and respectively applying a weight to the received data according to the multi-carrier CDMA method based on the block-based partial-carrier spreading, the weight allowing adaptive control.

The weights determined to be applicable to the receiver are used for the weights applicable to the transmitter.

In still further another aspect of the present invention, a transmission method for the multi-carrier CDMA comprises: converting input data into parallel data; copying the converted parallel data as many times as a predetermined number of blocks, and spreading the data with different spread codes according to the copied data blocks, the spreading being performed for a part of the copied data blocks composed of multi-carriers for multiplexing users; and performing IFFT on the spread data and transmitting the executed data through a transmit antenna.

In still further another aspect of the present invention, a receiving method for the multi-carrier CDMA comprises: performing FFT on the signal received through a receive antenna, and outputting FFT-performed data; despreading the FFT-performed data with different spread codes, dividing the despread data into a predetermined number of blocks, combining the data, and outputting combined data, the different spread codes being codes used when spreading a part of blocks composed of multi-carriers for multiplexing users; and converting the combined and output data into serial data, and outputting the serial data.

BEST MODE

An MC-CDMA transfer device and method using the block-based multi-carrier spreading according to exemplary embodiments of the present invention will be described with reference to drawings.

Figure 1:
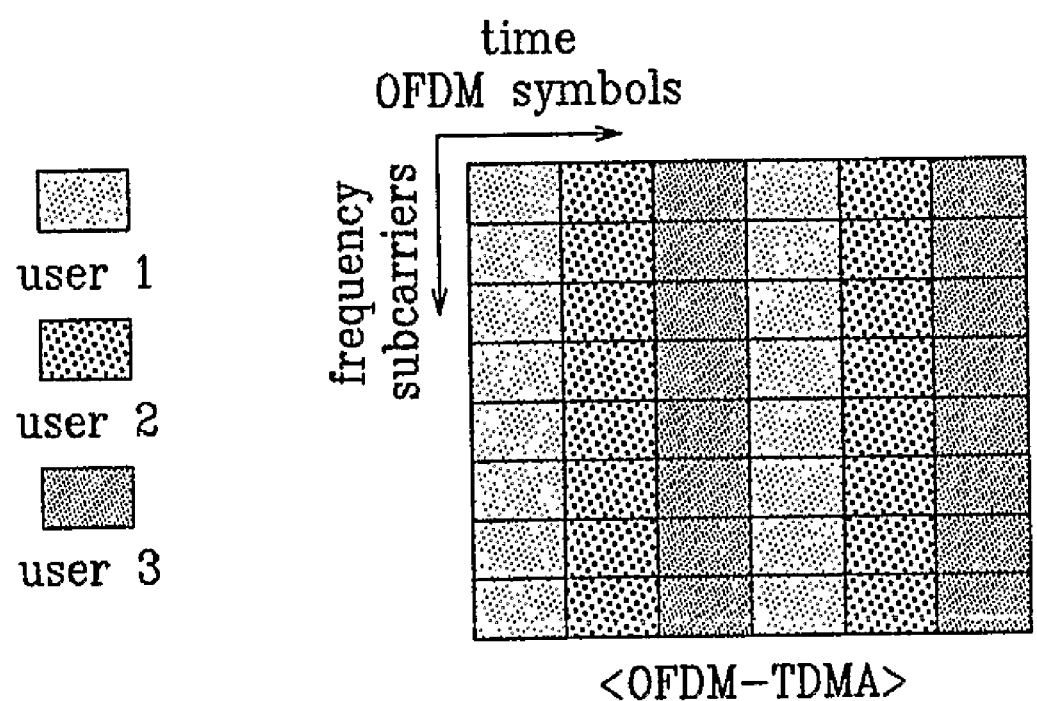
FIG. 1 shows conventional OFDM-TDMA scheme.
Figure 2:
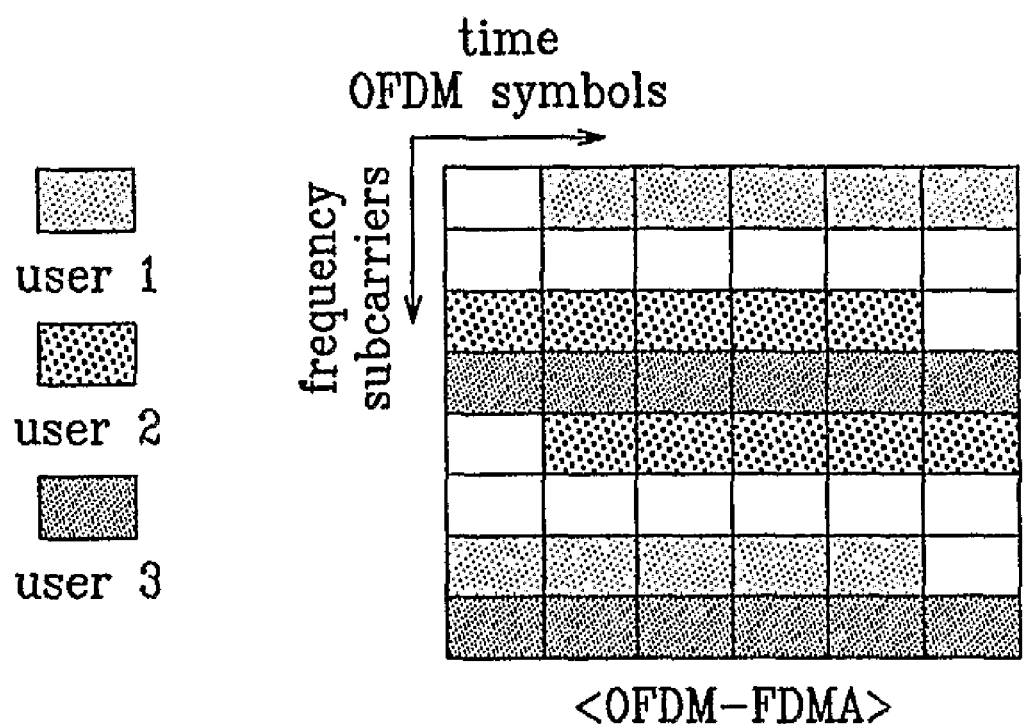
FIG. 2 shows conventional OFDM-FDMA scheme.
Figure 3:
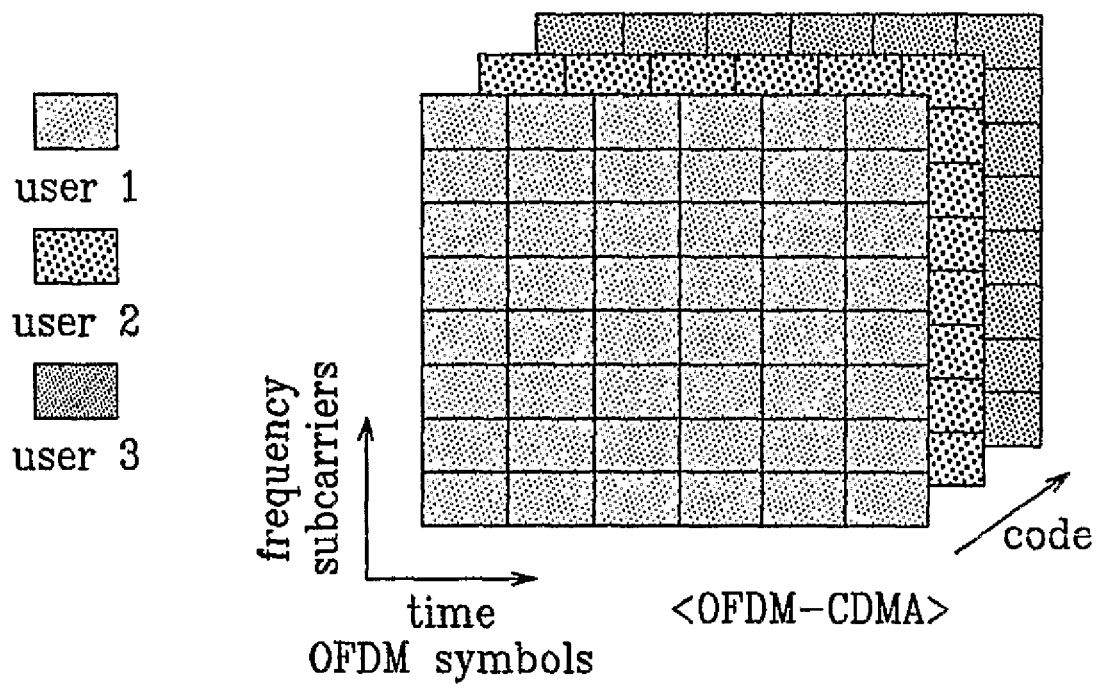
FIG. 3 shows conventional MC-CDMA scheme.
Figure 4:
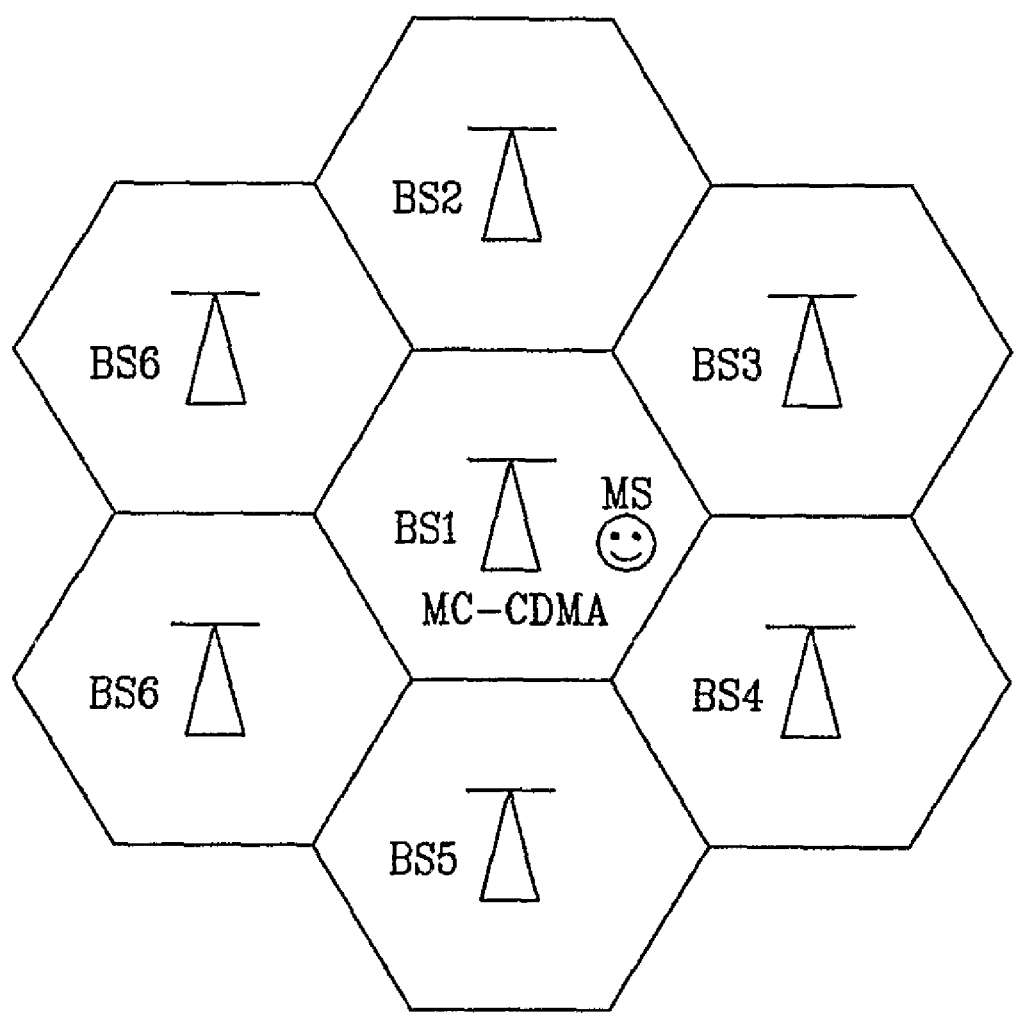
FIG. 4 shows a diagram for an MC-CDMA model using the block-based multi-carrier spreading according to an exemplary embodiment of the present invention.

As shown in FIG. 4, the block-based multi-carrier spreading is used in the MC-CDMA model which is resistant against multi-path fading in the multi-cell environment to thereby obtain multi-carrier-based frequency diversity and optimize inter-cell and inter-code interference reduction.

Figure 5:
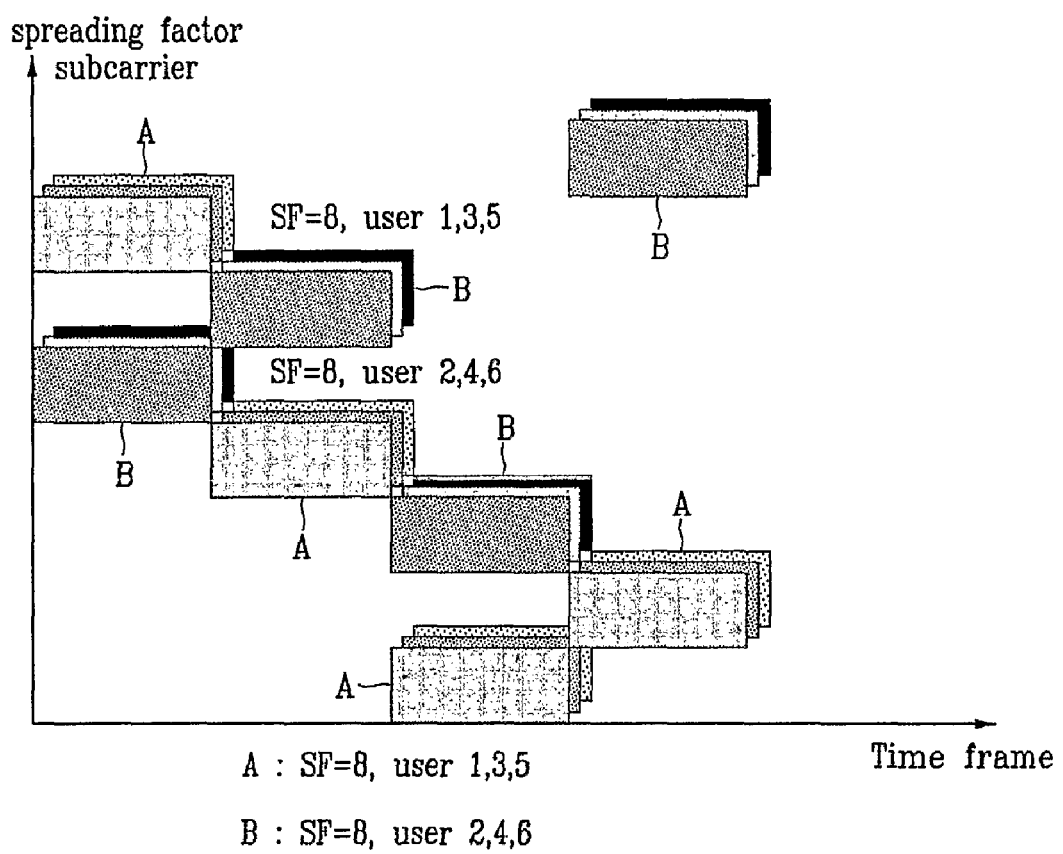
FIG. 5 shows a conceptual diagram for an MC-CDMA model using the block-based multi-carrier spreading according to an exemplary embodiment of the present invention.

FIG. 5 shows a conceptual diagram for the MC-CDMA using the block-based multi-carrier spreading according to an exemplary embodiment of the present invention.

As shown, the merits of MC-CDMA which is resistant against interference caused by multi-cells are used. In detail, codes are multiplexed, and block-based carriers are spread to a broadband, which may be the optimal method for multiplexing the cells depending on the carriers in a like manner of the OFDMA. In the embodiment, the carriers are partially spread per each block of multi-carrier, and hence, the inter-cell interference from the multi-cells is minimized.

Figure 6:
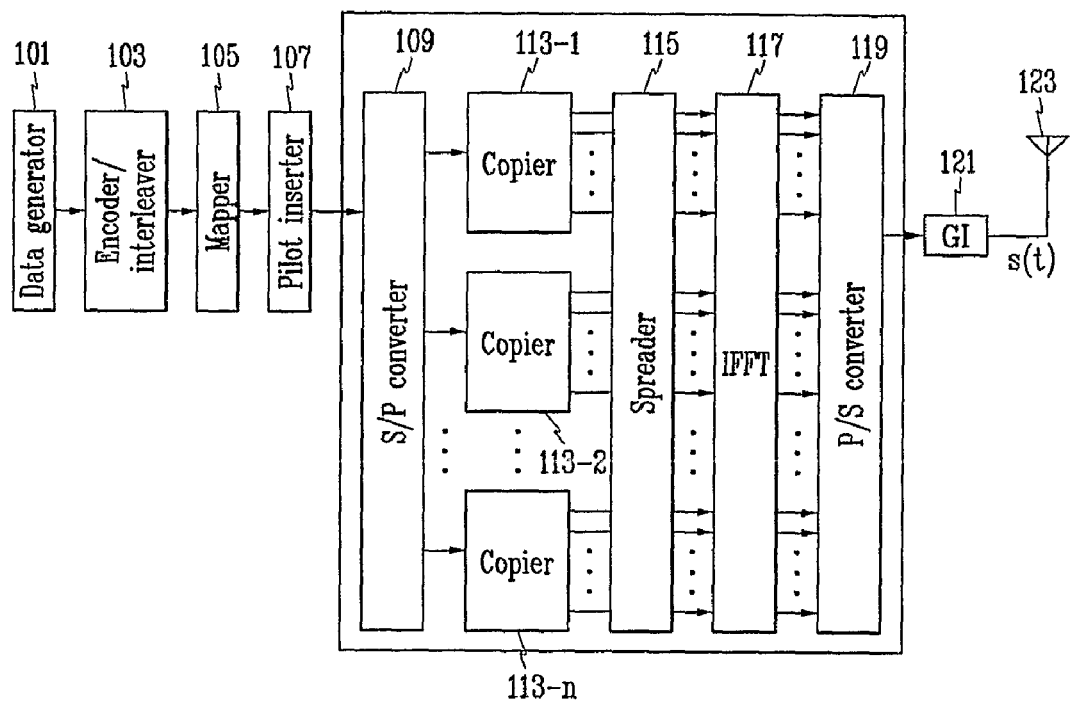
FIG. 6 shows a block diagram for an MC-CDMA transmitting device using the block-based multi-carrier spreading according to an exemplary embodiment of the present invention.

FIG. 6 shows a block diagram for an MC-CDMA transmitting device using the block-based multi-carrier spreading according to an exemplary embodiment of the present invention.

As shown, the MC-CDMA transmitting device includes a data generator 101, an encoder/interleaver 103, a mapper 105, a pilot inserter 107, a serial to parallel converter 109, n copiers 113-1 to 113-$n$, a spreader 115, an IFFT (Inverse Fast Fourier Transform) unit 117, a parallel to serial converter 119, and a guard interval inserter 121.

The data generator 101 generates data to be transmitted according to the MC-CDMA method using the block-based multi-carrier spreading.

The encoder/interleaver 103 encodes and interleaves transmission data generated by the data generator 101, and outputs result data.

The mapper 105 converts the data output by the encoder/interleaver 103 into signals which follow a predetermined modulation method (e.g., a 4-ary QPSK), and outputs the signals.

The pilot inserter 107 multiplexes the data output by the mapper 105 and inserts a pilot into the multiplexed data.

The serial to parallel converter 109 converts the serial data output by the pilot inserter 107 into a predetermined number (e.g., n) of parallel data, and outputs the parallel data.

The copiers 113-1 to 113-$n$ copy each of the n parallel data output by the serial to parallel converter 109 as many times as the number of spread factors (SF), and output result data.

The spreader 115 uses different spread codes for the respective data output by the copiers 113-1 to 113-$n$ to spread the data with respect to the frequency axis, and outputs spread results. Here, the spreader 115 apply the different spread codes to the respective data output. Therefore the respective data output is partially multiplexed per block for the block-based multi-carrier partial spreading.

The IFFT unit 117 performs IFFT on the data spread and output by the spreader 115 using the block-based multi-carriers, and outputs result data.

The parallel to serial converter 119 converts the parallel data output by the IFFT unit 117 into serial data, and outputs the serial data.

The guard interval inserter 121 inserts a guard interval to the data output by the parallel to serial converter 119, and outputs result data to the transmit antenna 123.

An operation of the transmitting device shown in FIG. 6 will be described.

A transmission data sequence generated by the data generator 101 is encoded and interleaved by the encoder/interleaver 103, and converted into signals of a predetermined modulation method by the mapper 105.

A pilot is inserted into the transmission data sequence which is mapped to be signals of the predetermined modulation method by the pilot inserter 107, and the transmission data sequence is then converted into n parallel data by the serial to parallel converter 109.

The n parallel data are respectively copied as many times as the number of spread factors by the n copiers 113-1 to 113-$n$ and are output to spreader 115.

Then, as shown in FIG. 5, the spreader 115 do not allocates all carriers to one user, but applies the different spread codes to the respective block-based multi-carriers to multiplexes per user using the block-based multi-carrier partial spreading. Therefore, the respective data output by n copiers 113-1 to 113-$n$ are spread per a part of the block-based multi-carriers with respect to the frequency axis by the spreader 115 using different spread codes.

The spread parallel data are IFFT-performed by the IFFT unit 117, and are converted into serial data by the parallel to serial converter 119, and a guard interval is inserted into the serial data by the guard interval inserter 121, and the serial data are transmitted as multi-carrier signals with n carriers to the receiver through the transmit antenna 123.

Figure 7:
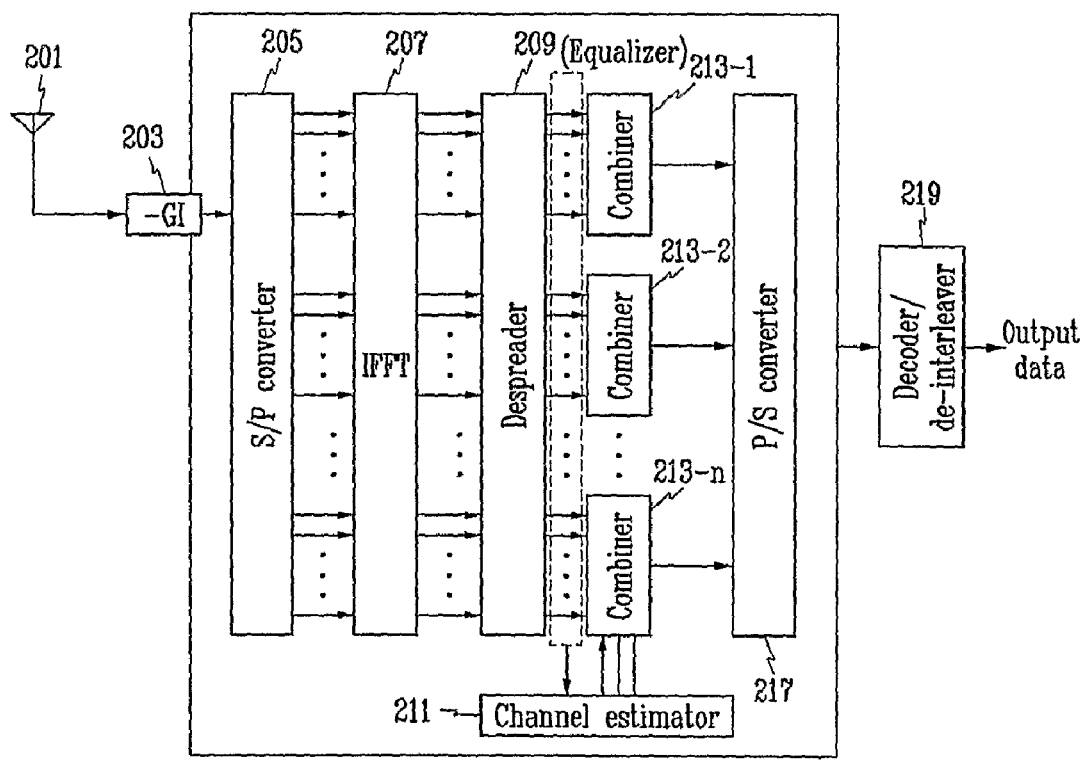
FIG. 7 shows a block diagram for an MC-CDMA receiving device using the block-based multi-carrier spreading according to an exemplary embodiment of the present invention.

FIG. 7 shows a block diagram for an MC-CDMA receiving device using the block-based multi-carrier spreading according to an exemplary embodiment of the present invention.

As shown, the MC-CDMA receiving device includes a guard interval eliminator (-GI) 203, a serial to parallel converter 205, an FFT unit 207, a despreader 209, a channel estimator 211, n combiners 213-1 to 213-$n$, a parallel to serial converter 217, and a decoder/de-interleaver 219.

The guard interval eliminator 203 eliminates the guard interval from the signal received through the receive antenna 201, and outputs a result signal.

The serial to parallel converter 205 converts the serial data output by the guard interval eliminator 203 into parallel data, and outputs the parallel data.

The FFT unit 207 performs FFT on the parallel data output by the serial to parallel converter 205, and outputs executed data.

The despreader 209 despreads the data output by the FFT unit 207 by using corresponding spread codes. Here, the despreader 209 despreads reusing the spread codes which are used in the block-based multi-carrier spreading.

The channel estimator 211 uses the data despread by the despreader 209 to output a channel estimate.

The n combiners 213-1 to 213-$n$ modify the data despread by the despreader 209 with the channel estimate provided by the channel estimator 211, combine the modified data as many times as the number of spread factors, and output n parallel data.

The parallel to serial converter 217 converts the parallel data output by the n combiners 213-1 to 213-$n$ into serial data, and outputs the serial data.

The decoder/de-interleaver 219 decodes/de-interleaves the data output by the parallel to serial converter 217, and outputs restored data.

An operation of the receiving device shown in FIG. 7 will be described.

The guard interval is eliminated from the signals received through the receive antenna 201 by the guard interval eliminator 203, the signals without the guard interval are converted into parallel data by the serial to parallel converter 205, and FFT is performed on the parallel data by the FFT unit 207.

The FFT-performed data are despread by the despreader 209 by using the corresponding spread codes. Here, the despreader 209 despreads reusing the spread codes which are used in the block-based multi-carrier spreading by the spreader 115 shown in FIG. 6.

Channel variation values of the respective subcarriers are estimated by the channel estimator 211, and the estimated channel variation values are compensated and combined by the n combiners 213-1 to 213-$n$ to output n parallel data.

The n despread parallel data are converted into serial data by the parallel to serial converter 217, and the serial data are than decoded and de-interleaved by the decoder/de-interleaver 219 to thus obtain final restored data.

Methods for combining the carriers by the n combiners 213-1 to 213-$n$ include the equal gain combining (EGC) method and the maximal ratio combining (MRC) method.

Also, when the codes are multiplexed, inter-code interference is generated, and an equalizer is used in this case to reduce the inter-code interference. The equalizer uses the minimum mean-square error (MMSE) method and the maximum likelihood detection (MLD) method and uses correlation of codes to eliminate the interference component and thereby efficiently process the interference.

As described above, the block-based multi-carrier spreading is used to spread and despread a part of all multi-carriers and accordingly has a strong characteristic against the interference signal. That is, much of within-cell interference and inter-cell interference is solved.

Further, the MC-CDMA transfer device using the frequency hopping method is an orthogonal variable spread factor (OVSF) system, and increases code spread factors in the multi-cell environment with much interference to thus reduce an influence of the interference. In addition, the modulation method can be adaptively varied according to the channel condition. In particular, as the carrier to noise Interference ratio (CINR) becomes lowered, the spread factor of codes is increased and a low data-rate modulation method is used. For example, for a high data rate transmission, the spreader 115 uses a low spread factor and the mapper 105 uses a high data-rate modulation method including 16QAM or 64QAM in the case of a good CINR environment, and the spreader 115 uses a high spread factor and the mapper 105 uses a low data-rate modulation method (including the BPSK and QPSK) to reduce the influence of the interference in the case of a bad CINR environment.

Figure 8:
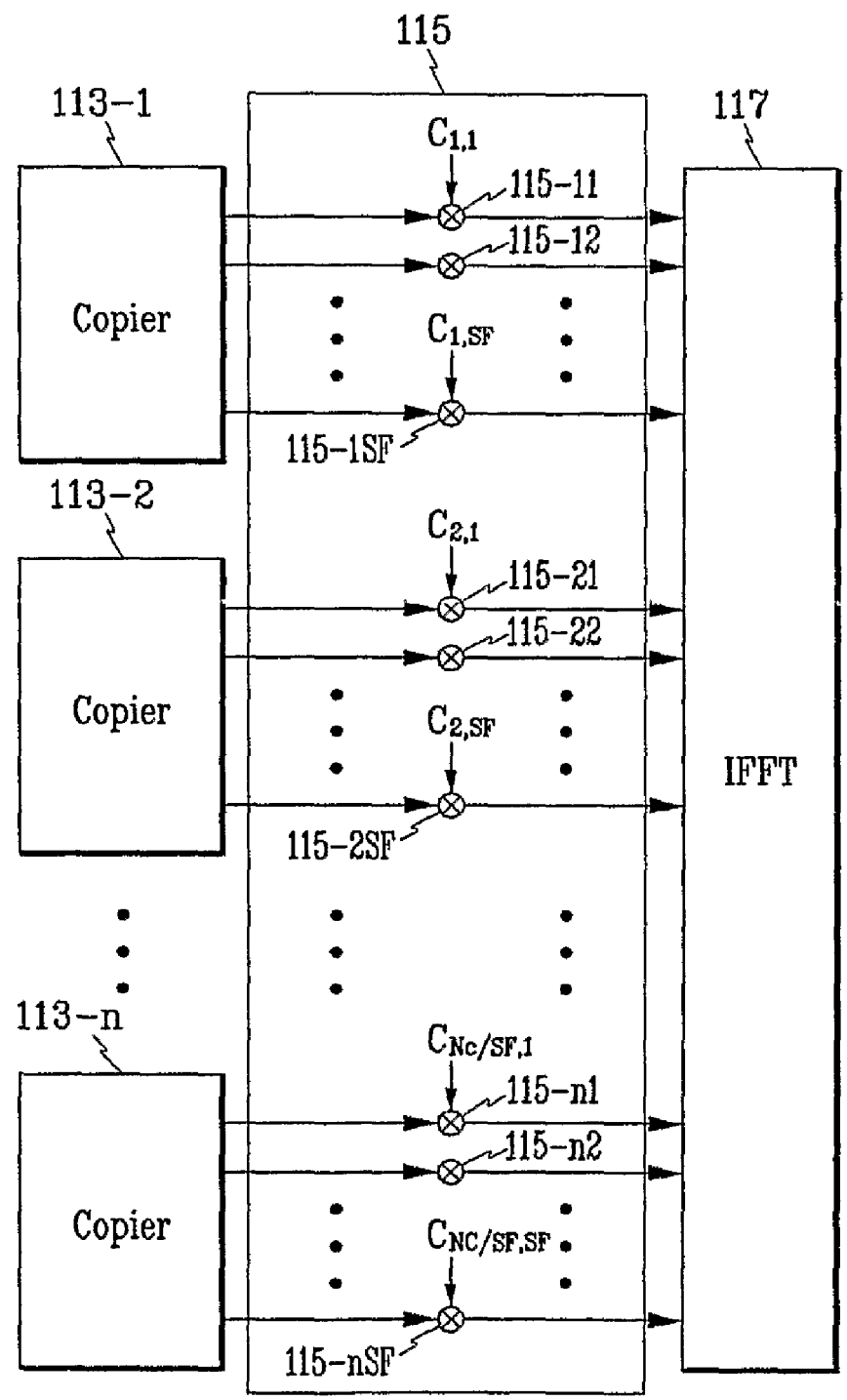
FIG. 8 shows an exemplified spread pattern applicable to the transmitting device shown in FIG. 6.

FIG. 8 shows an exemplified spread pattern applicable to the transmitting device shown in FIG. 6.

As shown in FIG. 8, the spreader 115 includes a plurality of multipliers 115-11 to 115-15F, 115-21 to 115-2SF, . . . , 115-n1 to 115-nSF for multiplying the parallel signals output by the n copiers 13-1 to 113-$n$ by different spread codes $C_{1,1}$ to $C_{1,SF}$, $C_{2,1}$ to $C_{2,SF}$, and $C_{n,1}$ to $C_{n,SF}$. In this instance, the number of multipliers is given to be n×SF, and SF represent the number of spread factors.

When the n copiers 113-1 to 113-$n$ of the transmitting device copy the parallel data output by the parallel converter 109 as many times as the number of spread factors and output copied data, the multipliers 115-11 to 115-1SF, 115-21 to 115-2SF, ..., 115-n1 to 115-nSF of the spreader 115 multiply the copied parallel data by the spread codes $C_{1,1}$ to $C_{1,SF}$, $C_{2,1}$ to $C_{2,SF}$, and $C_{n,1}$ to $C_{n,SF}$, and output multiplied data to the IFFT unit 117 thereby performing spreading on the frequency domain. Also, the respective spread codes $C_{1,1}$ to $C_{1,SF}$, $C_{2,1}$ to $C_{2,SF}$, and $C_{n,1}$ to $C_{n,SF}$ are set in consideration of the block-based partial spreading. For example, all multi-carriers are divided into two blocks and the divided two block-based partial-carrier is spread respectively. For example, the spread codes $C_{1,1}$ to $C_{1,SF}$ are divided into two blocks, that is the first block-based spread codes $C_{1,1}$ to $C_{1,SF/2}$ and the second block-based spread codes $C_{1,(SF/2)+1}$ to $C_{1,SF}$. Then, the two block-based spread codes $C_{1,1}$ to $C_{1,SF/2}$ and $C_{1,(SF/2)+1}$ to $C_{1,SF}$ are spread respectively.

Figure 9:
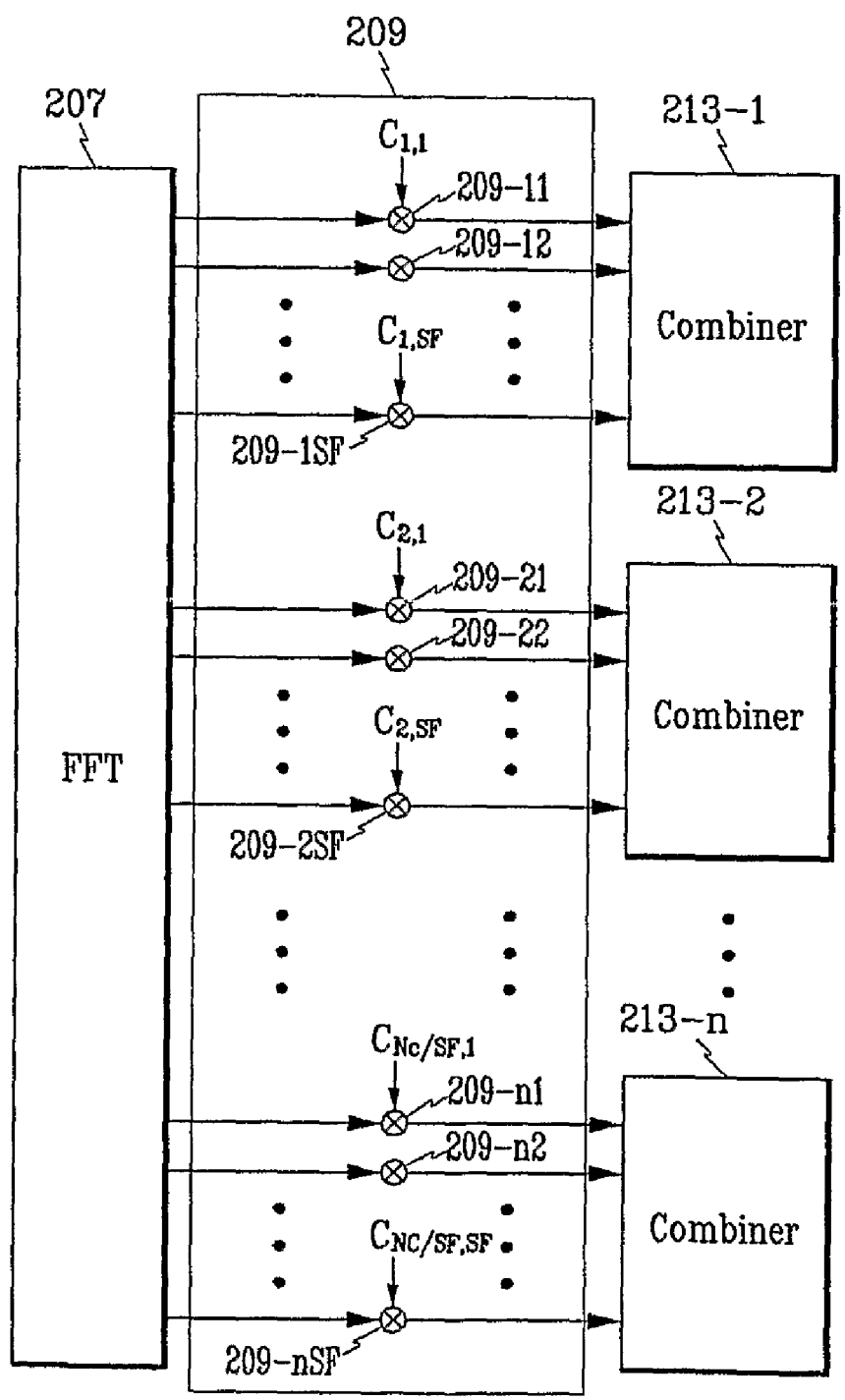
FIG. 9 shows an exemplified despreading pattern applicable to the receiving device shown in FIG. 7.

FIG. 9 shows an exemplified despread pattern applicable to the receiving device shown in FIG. 7.

As shown, the despreader 209 includes a plurality of multipliers 209-11 to 209-1SF, 209-21 to 209-2SF, ..., 209-n1 to 209-nSF for multiplying the parallel signals output by the FFT unit 207 by different spread codes, that is, spread codes spread code $C_{1,1}$ to $C_{1,SF}$, $C_{2,1}$ to $C_{2,SF}$, $C_{n,1}$ to $C_{n,SF}$ used by the spreader 115. In this instance, the number of multipliers is given to be n×SF.

When the FFT 207 of the receiving device performs FFT on the data converted and output by the serial to parallel converter 205 and outputs executed data, the multipliers 209-11 to 209-1SF, 209-21 to 209-2SF, ..., 209-n1 to 209-nSF of the despreader 209 multiply the executed data by the spread codes $C_{1,1}$ to $C_{1,SF}$, $C_{2,1}$ to $C_{2,SF}$, $C_{n,1}$ to $C_{n,SF}$ corresponding to the parallel data output by the FFT unit 207, combine the multiplied data into groups of blocks as many times as the number of spread factors, and output the combined data to the n combiners 213-1 to 213-n to thus perform despreading on the frequency domain. The despreader 209 is in consideration of the block-based multi-carrier partial dispreading and despreads using the spread codes $C_{1,1}$ to $C_{1,SF}$, $C_{2,1}$ to $C_{2,SF}$, $C_{n,1}$ to $C_{n,SF}$ used in the spreader 115.

Figure 10:
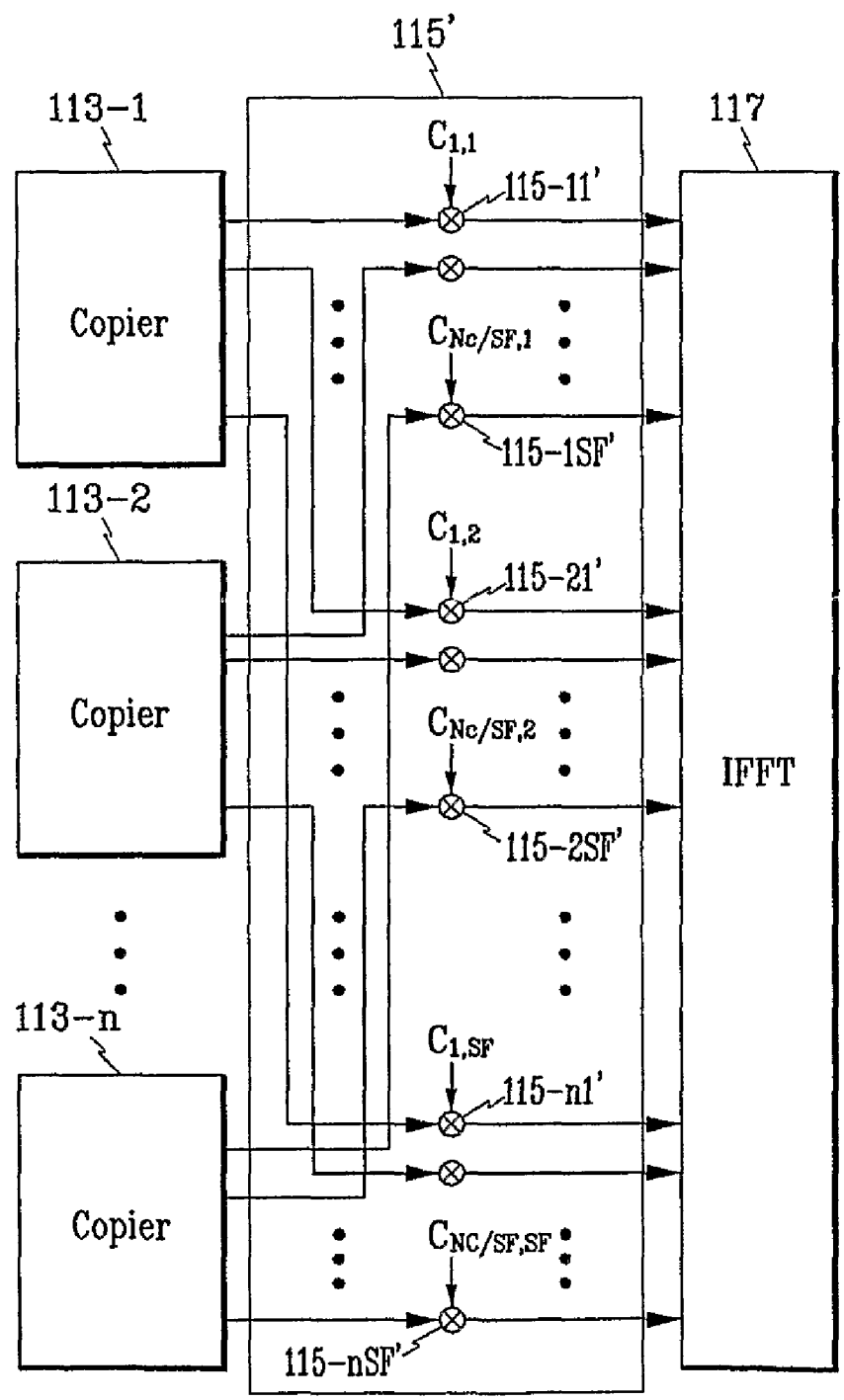
FIG. 10 shows another exemplified spread pattern applicable to the transmitting device shown in FIG. 6.

FIG. 10 shows another exemplified spread pattern applicable to the transmitting device shown in FIG. 6.

As shown in FIG. 10, the spreader 115' includes a plurality of multipliers 115-11' to 115-1SF', 115-21' to 115-2SF', ..., 115-n1' to 115-nSF' for multiplying the parallel signals output by the n copiers 113-1, 113-2, ..., 113-n by different spread codes $C_{1,1}$ to $C_{n,1}$, $C_{1,2}$ to $C_{n,2}$, $C_{1,SF}$ to $C_{n,SF}$. In this instance, the number of multipliers is given to be n×SF.

The spreader 115' is different from the spreader 115 described with reference to FIG. 8 in that the spreader 115' uses carriers with less correlation to spread the respective data on the frequency domain. That is, the spreader 115 in FIG. 8 spreads the SF-numbered parallel signals output by the copier 113-1 by using the same block-based spread codes $C_{1,1}$ to $C_{1,SF}$ with high correlation, and the spreader 115' selects a single output signal from each of the n copiers 113-1 to 113-n to generate a single group of blocks, and uses the same block-based spread code with high correlation to the corresponding block to perform spreading, and as a result, the spread codes $C_{1,1}$ to $C_{n,1}$ with less correlation are used to the SF parallel signals output by the same copier (e.g., 113-1) to thus perform spreading.

Figure 11:
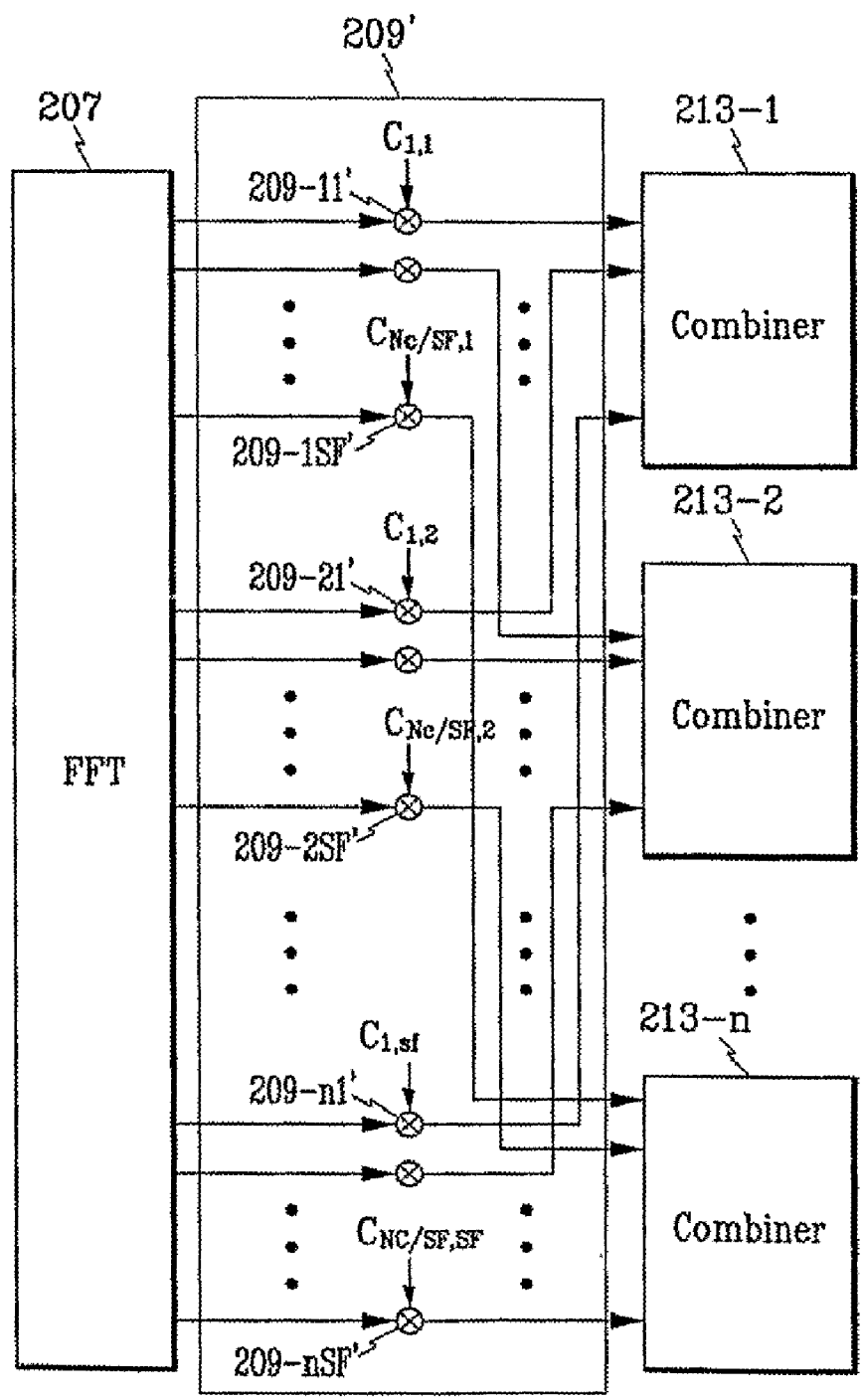
FIG. 11 shows another exemplified despreading pattern applicable to the receiving device shown in FIG. 7.

FIG. 11 shows another exemplified despread pattern applicable to the receiving device shown in FIG. 7.

As shown in FIG. 11, the despreader 209' includes a plurality of multipliers 209-11' to 209-1SF', 209-21' to 209-2SF', ..., 209-n1' to 209-nSF' for multiplying the parallel signals output by the FFT unit 207 by different spread codes $C_{1,1}$ to $C_{n,1}$, $C_{1,2}$ to $C_{n,2}$, $C_{1,SF}$ to $C_{n,SF}$ used by the spreader 115' shown in FIG. 8. In this instance, the number of multipliers is given to be n×SF.

The despreader 209' is different from the spreader 209 described with reference to FIG. 9 in that the spreader 209' uses carriers with less correlation to spread the respective data on the frequency domain. That is, the despreader 209 in FIG. 9 receives the block-based data spread and transmitted by the spreader 115 and despreads the same by using the same block-based spread codes $C_{1,1}$ to $C_{1,SF}$ with high correlation, and the despreader 209' receives block-based data spread and transmitted by the spreader 115' from the FFT unit 207, uses the same block-based spread codes $C_{1,1}$ to $C_{n,1}$, $C_{1,2}$ to $C_{n,2}$, $C_{1,SF}$ to $C_{n,SF}$ with less correlation to the corresponding block to perform spreading, and hence, the spread codes with less correlation are used to the same block-based data to thus perform spreading.

The combination of multi-carrier signals by using adjacent carriers deteriorates the frequency effect since the adjacent carriers have much correlation in the multi-carrier system. Therefore, as described with reference to FIGS. 10 and 11, the deterioration of frequency effect is reduced and great frequency diversity is obtained by combining the subcarrier signals with less correlation and spreading and despreading the combined subcarrier signals.

Figure 12:
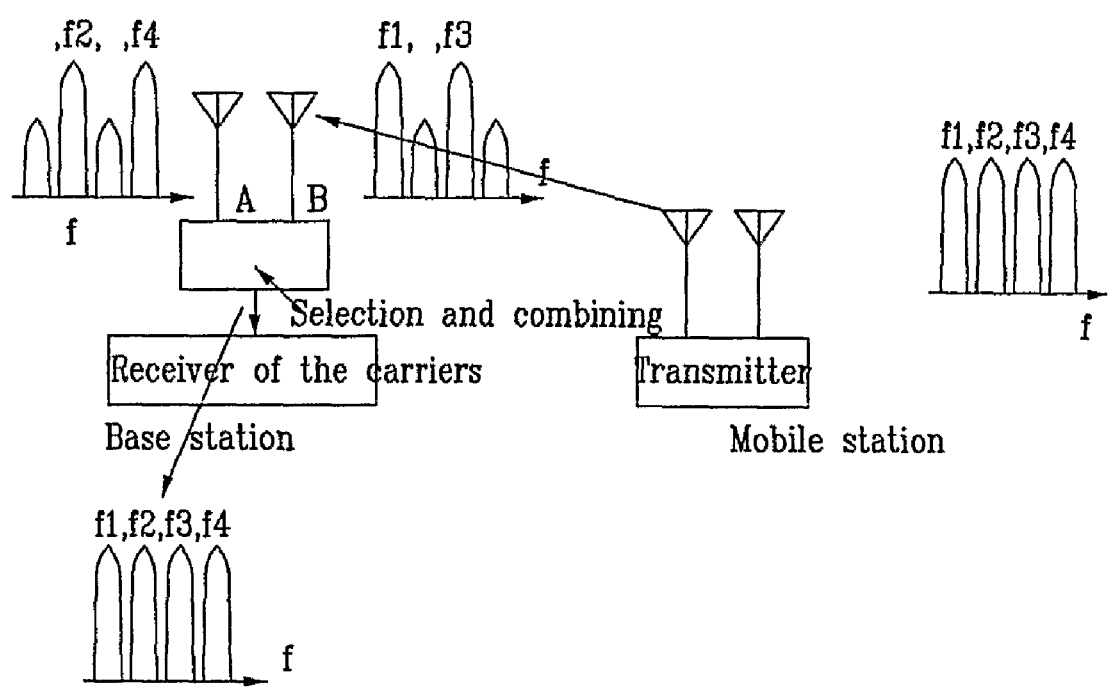
FIG. 12 shows a concept of transmission diversity in an uplink case.
Figure 13:
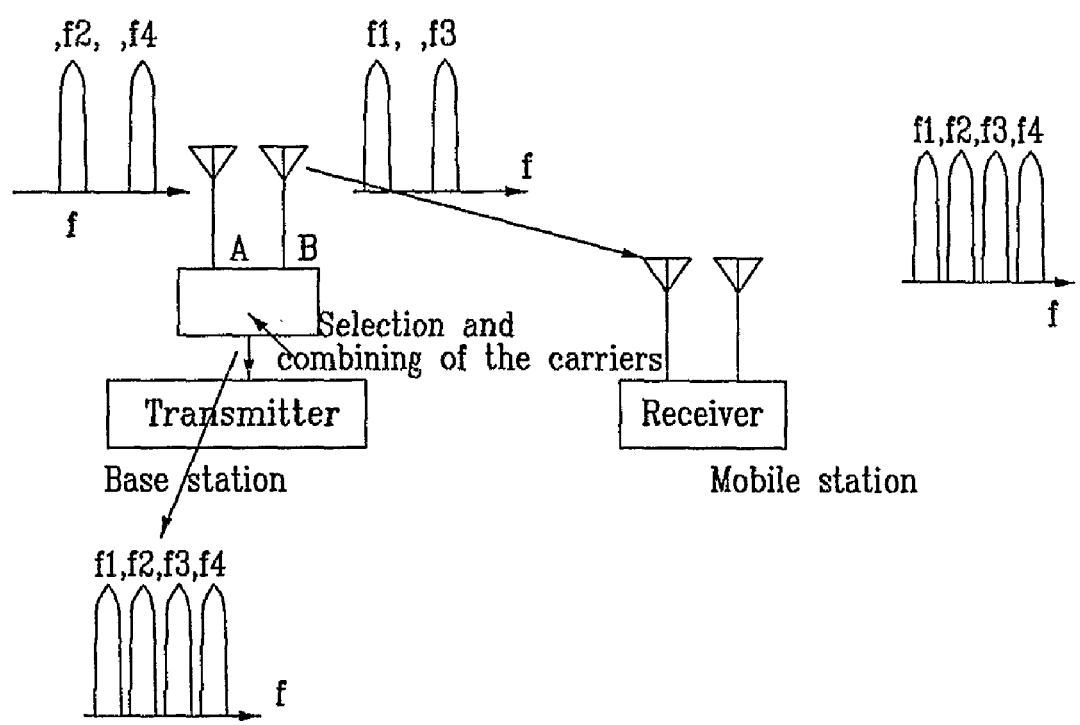
FIG. 13 shows a concept of transmission diversity in a downlink case.

FIG. 12 shows a concept of transmission diversity in an uplink case and FIG. 13 shows a concept of transmission diversity in a downlink case.

The uplink and downlink have a characteristic of high correlation in the case of using the time division duplex (TDD). By using this advantage, received states of the uplink are measured to select antennas with good received states as shown in FIG. 12, and the states of the downlink channel are measured to select antennas with good states and transmit carriers as shown in FIG. 13.

Accordingly, better communication services are realized by using the carriers with a high received power and transmitting the data.

Figure 14:
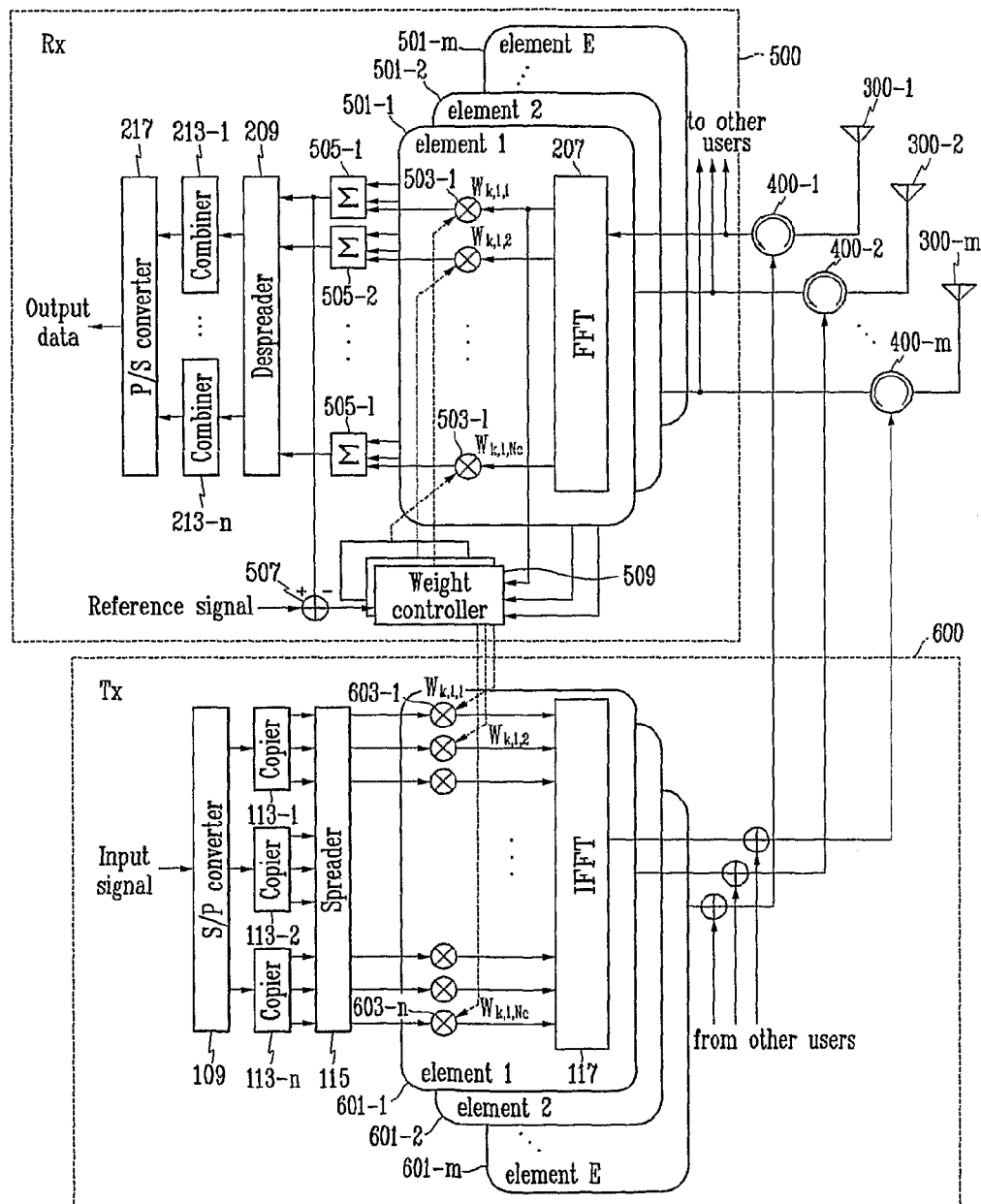
FIG. 14 shows a configuration diagram of a base station of the MC-CDMA transfer device using the block-based multi-carrier spreading according to a second exemplary embodiment of the present invention.

FIG. 14 shows a configuration diagram of a base station of the MC-CDMA transfer device using the block-based multi-carrier spreading according to a second exemplary embodiment of the present invention.

As shown, the base station includes array antennas 300-1 to 300-m with a plurality of elements, guard interval inserters and eliminators 400-1 to 400-m coupled to the array antennas 300-1 to 300-m, a receiving device 500 having input terminals coupled to the guard interval inserters and eliminators 400-1 to 400-m, and a transmitting device 600 having output terminals coupled to the guard interval inserters and eliminators 400-1 to 400-m.

The guard interval inserters and eliminators 400-1 to 400-m insert guard intervals into the signals output by the transmitting device 600, and output the signals through the array antennas 300-1 to 300-m, and eliminate the guard intervals from the signals received through the array antennas 300-1 to 300-m and output the signals to the receiving device 500.

Since the receiving device 500 is similar to the receiving device described with reference to FIG. 7, the components performing the same functions have the same reference numerals, and the components which are different from those of the receiving device shown in FIG. 7 will now be described.

Compared to the receiving device shown in FIG. 7, the receiving device 500 includes adaptive control blocks 501-1 to 501-m for adaptively controlling weights of the parallel signals output by the FFT unit 207 between the FFT unit 207 for performing FFT on the signals without guard intervals and the despreader 209 for despreading the signals output by the FFT unit 207.

The adaptive control blocks 501-1 to 501-*m* include a plurality of multipliers 503-1 to 503-*l* for multiplying the respective signals output by the FFT unit 207 by weights and outputting multiplied signals; a plurality of adders 505-1 to 505-*l* for adding the signals output by the multipliers corresponding to the respective adaptive control blocks and outputting added signals to the despreader 209; a subtractor 507 for calculating differences between the signals output by the adders and a predefined reference signal, and outputting calculated signals; and a weight controller 509 for controlling weights of the respective multipliers 503-1 to 503-*l* according to difference signals output by the subtractor 507.

Since the transmitting device 600 is similar to the transmitting device described with reference to FIG. 6, the components performing the same functions have the same reference numerals, and the components which are different from those of the transmitting device shown in FIG. 6 will now be described.

Compared to the transmitting device shown in FIG. 6, the transmitting device 600 includes adaptive control blocks 601-1 to 601-*m* for adaptively controlling weights of the parallel signals output by the spreader 115 between the spreader 115 and the IFFT unit 117 for performing IFFT on the signals spread and output by the spreader 115.

The adaptive control blocks 601-1 to 601-*m* include a plurality of multipliers 603-1 to 603-*l* for multiplying the respective signals output by the spreader 115 by weights and outputting multiplied signals. In this instance, the weight controller 509 of the receiving device 500 controls the weights input to the multipliers 603-1 to 603-*l*. That is, the weights for adaptively controlling the multipliers 503-1 to 503-*l* are applied in a like manner to the multipliers 603-1 to 603-*l* of the transmitting device 600 according to the respective array antennas 300-1 to 300-*m* of the receiving device 500.

In the above-described MC-CDMA transfer device using the block-based multi-carrier spreading, and in particular, the adaptively controllable transfer device configured in the base station, the uplink indicates multi-carrier signals with the same number of subcarriers as that of downlink lines, and the base station includes array antennas 300-1 to 300-*m* having a plurality of elements.

Therefore, in the case of an uplink, the signals transmitted by a mobile station are provided to the respective elements of the array antennas 300-1 to 300-*m*, guard intervals are eliminated from the signals by the guard interval inserters and eliminators 400-1 to 400-*m*, and the executed signals are FFT-performed by the FFT unit 217 to thus obtain subcarrier signals. The adaptive control blocks 501-1 to 501-*m* adaptively control the weights of the subcarrier signals. Hence, a received characteristic by the receiving device 500 of the base station in the case of the uplink is improved according to the above-noted adaptive control.

In the case of the TDD method, since the channel qualities of the uplink and the downlink are almost the same, the weight determined for adaptive control in the uplink is applicable to the subcarrier signals in the downlink. That is, the respective adaptive control blocks 601-1 to 601-*m* receive a weight for adaptive control from the adaptive control blocks 501-1 to 501-*m*, that is, the weight controller 509 to adaptively control the subcarrier signals which are generated by converting input serial data into parallel data to spread by the spreader 115, and outputs the adaptively controlled subcarrier signals to the IFFT unit 117. Since the channel qualities measured through the adaptive control in the uplink are reflected to the downlink, a transmitted characteristic by the transmitting device 600 is improved, and in particular, since the channel in the downlink is measured to thus apply transmission diversity to the uplink, a transmission diversity effect is obtained.

In reference to FIG. 14, in the above embodiment, the adaptive control has been described to be executed for each subcarrier in the uplink and the downlink, and in addition, without being restricted to this, it is also possible to arrange the subcarriers into blocks and adaptively control the weight for each block, or define a common weight for the subcarriers and adaptively control the common weight.

The weight control method includes the MRC method for maximizing the SN ratio of signals and allowing directivity in the desired signal direction, and the MMSE method for using a reference signal to suppress the interference signal and maximizing the signal to interference and noise ratio (SINR).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, the frequency diversity is obtainable and inter-cell and inter-code interference reduction is optimized in the MC-CDMA method.

The same code is used in the case of inter-cell movement to thus allow soft handoff and obtain site diversity gains of the uplink and downlink, and the application of soft handoff increases cell coverage.

The PAPR is efficiently reduced by controlling the number of multiplexed users and the number of carriers.

In addition, capacity is further increased by suppressing the inter-cell and within-cell interference.

Also, the present invention is applicable to the uplink since no great deterioration is generated by the PAPR.

Also, transmission diversity is easily performed by application of TDD.

What is claimed is:

1. A transfer device for a multi-carrier CDMA scheme, comprising:
a serial to parallel converter for converting input data into parallel data;
a plurality of copiers for copying each of the parallel data as many times as the number of spread factors;
a spreader for spreading the respective data output by the plurality of copiers with respect to a frequency axis using different spread codes per user, when-multiplexing users using a block-based partial carrier spreading, the block being composed of multi carriers; and
an IFFT unit for performing inverse fast Fourier transform (IFFT) on the data spread by the spreader and transmitting the IFFT-performed data through a transmit antenna,
wherein the spreader divides the spread codes which are multiplied to a plurality of data output by one of the copiers respectively into blocks corresponding to the number of the users, applies the different spread codes of the divided blocks correspond to the users and performs the block-based partial carrier spreading.

2. The transfer device of claim 1, further comprising:
an encoder/interleaver for encoding the input data, interleaving the encoded data, and outputting interleaved data;
a mapper for converting the data output by the encoder/interleaver into signals of a predetermined modulation method, and outputting the signals; and
a pilot inserter for multiplexing and inserting a pilot into the data output by the mapper, and outputting the data to the serial to parallel converter.

3. The transfer device of claim 1, further comprising:
a parallel to serial converter for converting the parallel data output by the IFFT unit into serial data, and outputting the serial data; and
a guard interval inserter for inserting a guard interval into the data output by the parallel to serial converter, and outputting the executed data to the transmit antenna.

4. The transfer device of claim 1, further comprising:
an FFT unit for performing fast Fourier transform (FFT) on signals received through a receive antenna, and outputting data;
a despreader for despreading the data output by the FFT with different despread codes, the despread codes being differently applying per user and being identical to the spread codes;
a plurality of combiners for dividing the data despread by the despreader into a predetermined number of blocks, combining data of the respective blocks, and outputting the combined data; and
a parallel to serial converter for converting the data output by the plurality of combiners into serial data, and outputting the serial data.

5. The transfer device of claim 4, further comprising:
a guard interval eliminator for eliminating a guard interval from a signal received through the receive antenna, and outputting data; and
a serial to parallel converter for converting the output data into parallel data, and outputting the parallel data to the FFT unit.

6. The transfer device of claim 4, further comprising:
a channel estimator for using the data despread by the despreader to estimate a channel, and outputting an estimate to the combiner; and
a decoder/de-interleaver for decoding and de-interleaving the data output by the parallel to serial converter to output restored data.

7. The transfer device of claim 1, wherein the spreader spreads the data input for spreading by using carriers with less correlation in the frequency domain.

8. The transfer device of claim 1, wherein the transfer device is one of an orthogonal variable spreading factor (OVSF) system for varying a code spread factor and a Walsh code system, and transmitting the same depending on a multi-cell environment.

9. The transfer device of claim 1, wherein the transfer device is an adaptive modulation system for adaptively varying the modulation method and transmitting the same depending on the channel quality.

10. The transfer device of claim 4, wherein the despreader despreads the FFT-performed data by using carriers with less correlation in the frequency domain.

11. The transfer device of claim 4, wherein the transfer device uses the same code while moving to another cell, thereby enabling a soft handoff.

12. The transfer device of claim 4, wherein the combiners use an equalizer to reduce inter-code interference, by using the equal gain combining (EGC) method, the minimum mean-square error (MMSE) method, and the maximal likelihood detection (MLD) method.

13. A transfer device for a multi-carrier CDMA, comprising:
an array antenna having a plurality of antenna elements;
a spreader for copying the data output by the array antenna as many times as a predetermined number of blocks, and spreading the copied data blocks with respect to a frequency axis using different spread codes per user, the spreader spreading a part of the copied data blocks using a block-based partial carrier spreading and multiplexing users, the block being composed of multi carriers;
N adaptive transmission controllers for applying weights to the respective data spread by the spreader, performing inverse fast Fourier transform (IFFT) on the weighted data, and outputting the executed data to a corresponding antenna element of the antenna elements wherein N corresponds to the number of the antenna elements of the array antenna; and
a weight controller for controlling the weights of the adaptive transmission controllers according to a channel quality,
wherein the spreader divides the spread codes which are multiplied to a plurality of data output by one of the copiers respectively into blocks corresponding to the number of the users, applies the different spread codes of the divided blocks correspond to the users and performs the block-based partial carrier spreading.

14. The transfer device of claim 13, wherein the adaptive transmission controllers comprises:
a plurality of multipliers for multiplying the data output by the spreader by a weight controlled by the weight controller; and
an IFFT unit for performing IFFT on the data output by the multipliers, and outputting IFFT-performed data to the antenna elements.

15. The transfer device of claim 14, wherein the weight controller uses the same weight as the weight to which the channel quality measured by the receiving device is reflected, and controls the adaptive transmission controllers.

16. The transfer device of claim 13, further comprising:
an array antenna having a plurality of antenna elements;
N adaptive receiving controllers for performing fast Fourier transform (FFT) on the signals output by the array antenna, applying corresponding weights to the executed signals, and outputting weighted signals wherein N corresponds to the number of antenna elements of the array antenna;
a weight controller for controlling the weight of the adaptive receiving controllers according to a channel quality;
a despreader for despreading the data output by the adaptive receiving controller with different despread codes, the despread codes being differently applying per user and being identical to the spread codes; and
a plurality of combiners for dividing the data despread by the despreader into a predetermined number of blocks, combining the data of the respective divided blocks, and outputting data.

17. The transfer device of claim 16, wherein the adaptive receiving controllers comprises:
an FFT unit for performing fast Fourier transform (FFT) on the data output by the array antennas; and
a plurality of multipliers for multiplying the data output by the FFT unit by a weight controlled by the weight controller, and outputting weighted data to the despreader.

18. The transfer device of claim 13, wherein the spreader spreads the data input for spreading by using carriers with less correlation in the frequency domain.

19. The transfer device of claim 13, wherein the transfer device is one of an orthogonal variable spreading factor (OVSF) system for varying a code spread factor and a Walsh code system, and transmitting the same depending on a multi-cell environment.

20. The transfer device of claim 13, wherein the transfer device is an adaptive modulation system for adaptively varying the modulation method and transmitting the same depending on the channel quality.

21. The transfer device of claim 16, wherein the despreader despreads the FFT-performed data by using carriers with less correlation in the frequency domain.

22. The transfer device of claim 16, wherein the transfer device uses the same code while moving to another cell, thereby enabling a soft handoff.

23. The transfer device of claim 16, wherein the combiners use an equalizer to reduce inter-code interference, by using the equal gain combining (EGC) method, the minimum mean-square error (MMSE) method, and the maximal likelihood detection (MLD) method.

24. A transfer device comprising:
an array antenna having a plurality of antenna elements;
a transmitter for applying a weight to the respective transmission data and transmitting the weighted transmission data through the array antenna according to a multi-carrier CDMA method based on block-based partial-carrier spreading, the weight allowing adaptive control, the transmitter comprising a spreader for copying the transmission data as many times as a predetermined number of blocks, and spreading the copied data blocks with respect to a frequency axis using different spread codes per user, the spreader spreading the copied data blocks using a block-based partial carrier spreading and multiplexing users, the block being composed of multi carriers; and
a receiver for receiving the data through the array antenna and respectively applying a weight to the received data according to the multi-carrier CDMA method based on the block-based partial-carrier spreading, the weight allowing adaptive control,
wherein the receiver comprises a despreader for despreading the received data with different despread codes, the despread codes being differently applying per user and being identical to the spread codes,
wherein the spreader divides the spread codes which are multiplied to a plurality of data output by one of the copiers respectively into blocks corresponding to the number of the users, applies the different spread codes of the divided blocks correspond to the users and performs the block-based partial carrier spreading.

25. The transfer device of claim 24, wherein the weights determined to be applicable to the receiver are used for the weights applicable to the transmitter.

26. The transfer device of claim 24, wherein the transmitter comprises:
a spreader for copying transmission data as many times as a predetermined number of blocks, and spreading the copied data with different spread codes according to the copied data blocks, the spreader spreading a part of the copied data blocks composed of multi-carriers for multiplexing users;
N adaptive transmission controllers for applying weights to the respective data spread by the spreader, performing inverse fast Fourier transform (IFFT) on the weighted data, and outputting the executed data to a corresponding antenna element of the antenna elements wherein N corresponds to the number of antenna elements of the array antenna; and
a weight controller for controlling the weights of the adaptive transmission controllers.

27. The transfer device of claim 24, wherein the receiver comprises:
N adaptive receiving controllers for performing fast Fourier transform (FFT) on the signals output by the array antenna, applying corresponding weights to the executed signals, and outputting weighted signals, wherein N corresponds to the number of antenna elements of the array antenna;
a received weight controller for controlling the weight of the adaptive receiving controllers according to a channel quality;
a despreader for despreading the data output by the adaptive receiving controller with different spread codes, the different spread codes being codes used when spreading a part of blocks composed of multi-carriers for multiplexing users; and
a plurality of combiners for dividing the data despread by the despreader into a predetermined number of blocks, combining the data of the respective blocks, and outputting data.

28. The transfer device of claim 25, wherein the transmitter comprises:
a spreader for copying transmission data as many times as a predetermined number of blocks, and spreading the copied data with different spread codes according to the copied data blocks, the spreader spreading a part of the copied data blocks composed of multi-carriers for multiplexing users;
N adaptive transmission controllers for applying weights to the respective data spread by the spreader, performing inverse fast Fourier transform (IFFT) on the weighted data, and outputting the executed data to a corresponding antenna element of the antenna elements wherein N corresponds to the number of antenna elements of the array antenna; and
a weight controller for controlling the weights of the adaptive transmission controllers.

29. The transfer device of claim 25, wherein the receiver comprises:
N adaptive receiving controllers for performing fast Fourier transform (FFT) on the signals output by the array antenna, applying corresponding weights to the executed signals, and outputting weighted signals, wherein N corresponds to the number of antenna elements of the array antenna;
a received weight controller for controlling the weight of the adaptive receiving controllers according to a channel quality;
a despreader for despreading the data output by the adaptive receiving controller with different spread codes, the different spread codes being codes used when spreading a part of blocks composed of multi-carriers for multiplexing users; and a plurality of combiners for dividing the data despread by the despreader into a predetermined number of blocks, combining the data of the respective blocks, and outputting data.

30. A transfer method for a multi-carrier CDMA, comprising:
(a) converting input data into parallel data;
(b) copying the converted parallel data as many times as a predetermined number of blocks, and spreading the copied data blocks with respect to a frequency axis using different spread codes per user, the spreading spreading the copied data blocks using a block-based partial carrier spreading and multiplexing users, the block being composed of multi carriers; and (c) performing inverse fast Fourier transform (IFFT) on the spread data and transmitting the executed data through a transmit antenna, Wherein in b), the spread codes which are multiplied to one of the copied data blocks respectively is divided into blocks corresponding to the number of the users and the different spread codes of the divided blocks are applied correspond to the users and the block-based partial carrier spreading is performed.

31. The transfer method of claim 30, further comprising:

(d) performing fast Fourier transform (FFT) on a signal received through a receive antenna, and outputting FFT-performed data;

(e) despreading the FFT-performed data with different despread codes, dividing the despread data into a predetermined number of blocks, combining the data, and outputting combined data, the despread codes being differently applying per user and being identical to the spread codes; and (f) converting the combined and output data into serial data, and outputting the serial data.

* * * * *